(12) United States Patent
Nefcy et al.

(10) Patent No.: US 9,341,262 B2
(45) Date of Patent: *May 17, 2016

(54) METHOD AND APPARATUS FOR DRIVELINE SOFTENING IN A VEHICLE

(71) Applicant: Ford Global Technologies, LLC, Dearborn, MI (US)

(72) Inventors: Bernard D. Nefcy, Novi, MI (US); Mark Steven Yamazaki, Canton, MI (US); Walter Joseph Ortmann, Saline, MI (US); Marvin Paul Kraska, Dearborn, MI (US); Daniel Scott Colvin, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/734,036

(22) Filed: Jun. 9, 2015

(65) Prior Publication Data

US 2015/0267808 A1  Sep. 24, 2015

Related U.S. Application Data

(63) Continuation of application No. 13/897,477, filed on May 20, 2013, now Pat. No. 9,080,668.

(51) Int. Cl.
*F16H 59/66* (2006.01)
*B60W 20/00* (2016.01)
*B60W 10/02* (2006.01)
*F16H 61/14* (2006.01)
*G01C 21/36* (2006.01)

(52) U.S. Cl.
CPC ........... *F16H 61/143* (2013.01); *B60W 10/023* (2013.01); *B60W 10/026* (2013.01); *B60W 20/00* (2013.01); *F16H 59/66* (2013.01); *G01C 21/3697* (2013.01); *B60W 2550/14* (2013.01); *B60W 2550/40* (2013.01); *F16H 2061/145* (2013.01); *Y10S 903/946* (2013.01)

(58) Field of Classification Search
CPC ...... F16H 59/66; B60W 20/00; B60W 10/023
USPC .......................................................... 701/2
See application file for complete search history.

(56) References Cited

U.S. PATENT DOCUMENTS

| 8,099,220 | B2 | 1/2012 | Kim |
| 8,386,091 | B2 | 2/2013 | Kristinsson |
| 2013/0054050 | A1 | 2/2013 | Filev |
| 2013/0296122 | A1 | 11/2013 | Banker et al. |

*Primary Examiner* — Fadey Jabr
*Assistant Examiner* — Yazan A Soofi
(74) *Attorney, Agent, or Firm* — David B. Kelley; Brooks Kushman P.C.

(57) ABSTRACT

A vehicle includes a power source, such as an engine, an electric machine, or combination thereof. A torque converter is selectively coupled to the power source such that drive torque can be altered before being distributed into a transmission of the vehicle. A torque converter bypass clutch enables torque from the power source to selectively transmit directly to the transmission with little or no torque altering provided by the torque converter. At least one controller in the vehicle is in communication with a storage device. The controller sends road condition data to the storage device regarding a road segment. During a subsequent drive to or over the road segment, the controller receives the road condition data and enables the torque converter bypass clutch to slip to dampen driveline disturbances when the vehicle passes over the road segment.

20 Claims, 7 Drawing Sheets

METHOD AND APPARATUS FOR DRIVELINE SOFTENING IN A VEHICLE

CROSS-REFERENCE TO RELATED APPLICATIONS

This application is a continuation of U.S. application Ser. No. 13/897,477 filed May 20, 2013, now U.S. Pat. No. 9,080,668, the disclosure of which is hereby incorporated in its entirety by reference herein.

TECHNICAL FIELD

The present disclosure generally relates to a vehicle to cloud to vehicle system for driveline softening in a vehicle.

BACKGROUND

Vehicle-to-cloud (V2C) communication systems include a wireless communication device capable of communicating data to and from an offsite or remote facility (i.e., the "cloud"). V2C systems are emerging as communication technologies expand within vehicles. Infotainment systems are the typically the only system in the vehicle that integrates such external interaction with remote sources.

Implementation of V2C communications along with powertrain components is mostly unpracticed. One reason for this is that control systems internal within the vehicle can operate in a real-time environment with extremely fast communication speeds, which is especially important for operation of powertrain components. Internet systems, on the other hand, often times include independent databases and facilities that operate at slower speeds due to the capacity and amounts of data transfer with other vehicles. Therefore, V2C communication systems typically operate on demand, as opposed to the continuous operation of internal control systems in the vehicle.

SUMMARY

According to one embodiment, a method of operating a vehicle having a torque converter bypass clutch is provided. Route of travel information is stored. The route of travel information includes road condition data corresponding to a road segment that has been traveled over by the vehicle. During a subsequent travel toward the road segment, clutch pressure in the torque converter bypass clutch is modified based at least upon the stored road condition data.

According to another embodiment, a method for controlling a vehicle is provided. The method includes altering operation of a torque converter bypass clutch based at least upon received road condition data indicating an upcoming change in road condition of a road segment.

The method may further include storing the road condition data on an on-board storage device during a first travel over the road segment. The step of altering may include altering clutch pressure of the torque converter bypass clutch during a second travel over the road segment based at least upon the stored road condition data.

According to yet another embodiment, a vehicle comprises a power source, a transmission, a clutch selectively coupling the power source to the transmission, and at least one controller. The at least one controller is programmed to (i) send route of travel information including road condition data of a traveled-over road segment to a storage device, (ii) subsequently receive the road condition data from the storage device when traveling toward the road segment, and (iii) modify pressure in the clutch based upon the received road condition data.

In these the above embodiments, the route of travel information may further includes data indicating a location of the vehicle, data received from a suspension system indicating the terrain of the road segment, data received from a brake system indicating brake usage during travel over the road segment, and/or data indicating accelerator pedal usage during travel over the road segment. Storing of the route of travel information and road condition data may be accomplished utilizing an on-board storage device.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
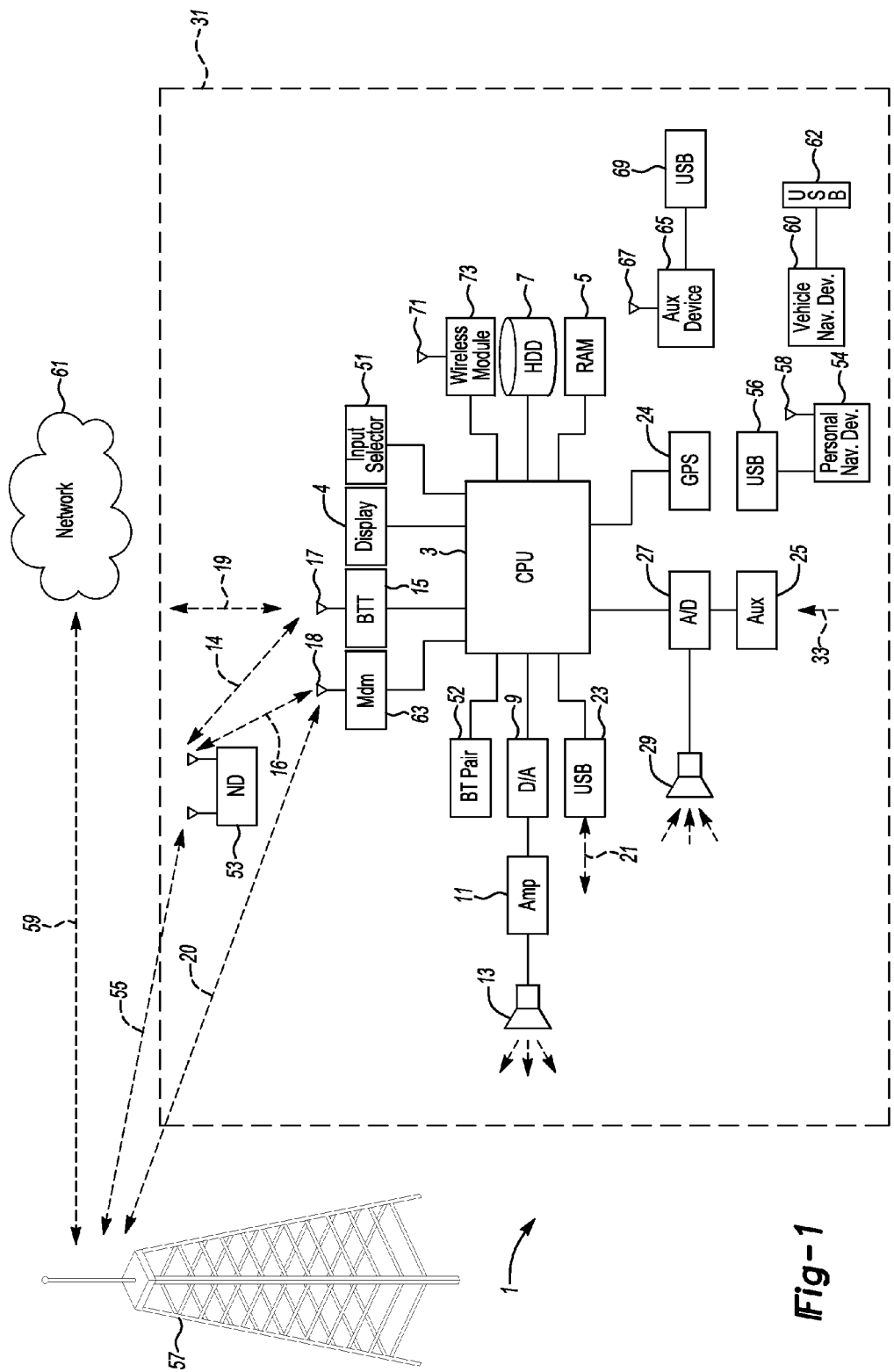
FIG. 1 illustrates an example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment shown in FIG. 1, a processor 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory.

The processor 3 is also provided with a number of different inputs allowing the user to interface with the processor 3. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a CAN bus) to pass data to and from the VCS 1 (or components thereof).

Outputs to the system can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU 3 is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the operator of the nomadic device can talk over the device while data is being transferred. At other times, when the operator is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users.

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, nomadic device 53 may be a wireless local area network (LAN) device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the vehicle's processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 can be in communication with a variety of other auxiliary devices 65. These devices can be connected through a wireless 67 or wired 69 connection. Auxiliary devices 65 may include, but are not limited to, personal media players, wireless health devices, portable computers, and the like.

Also, or alternatively, the CPU 3 can be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In the illustrative embodiments, an on-board Vehicle-to-Cloud (V2C) implementation is introduced. The V2C communicates with a powertrain using local communication channels, such as, but not limited to, a CAN bus, in the same manner as other ECUs. The V2C also can communicate with cloud based computing services over mobile communication channels. In at least one embodiment, the V2C is more than a simple relay, it actively processes and converts data from one system to be fed to another, and is capable of error handling.

Figure 2A:
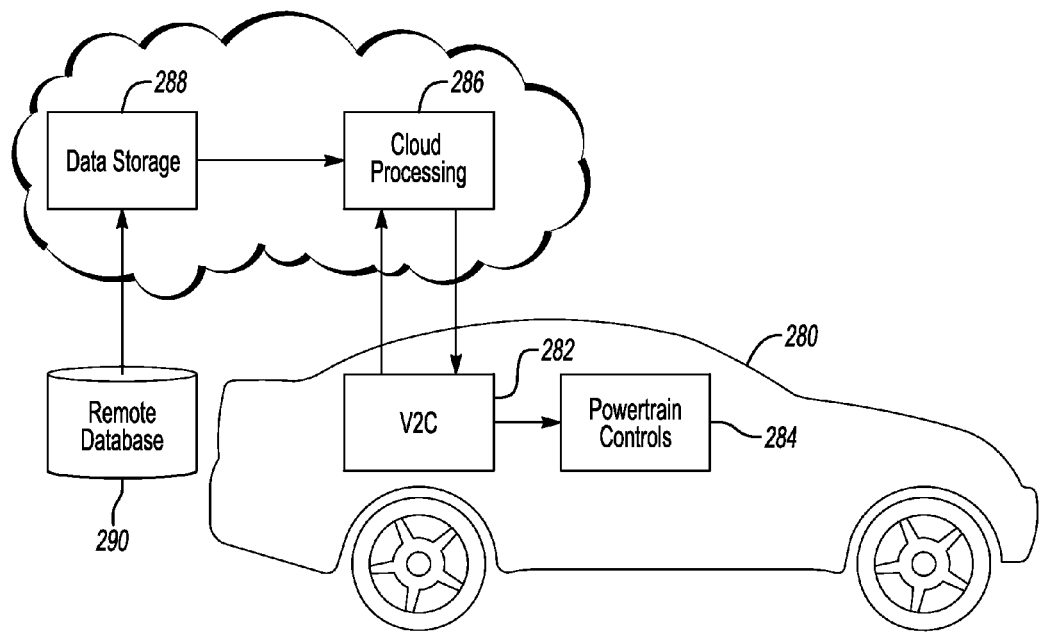
FIG. 2A illustrates one example of a vehicle computing system (VCS) in communication with the cloud.

FIG. 2A shows one example of a vehicle computing system (VCS) in communication with the cloud. In this example, a vehicle 280 has both a vehicle-to-cloud (V2C) system 282 and a powertrain control system 284 contained therein. The V2C system allows the driver to request remote computations from the cloud. In this illustrative example, the remote computation may relate to, for example, an intended destination as predicted by a prediction process executed in remote, cloud-based processing 286. In this example, the prediction process may draw on one or more remote resources, such as a database 290 or other cloud-based data resources 288. The prediction process is described in more detail with respect to FIGS. 4 and 5. By having a two way communication path with the cloud, the system can also be referred to as a vehicle-to-cloud-to-vehicle system.

Figure 2B:
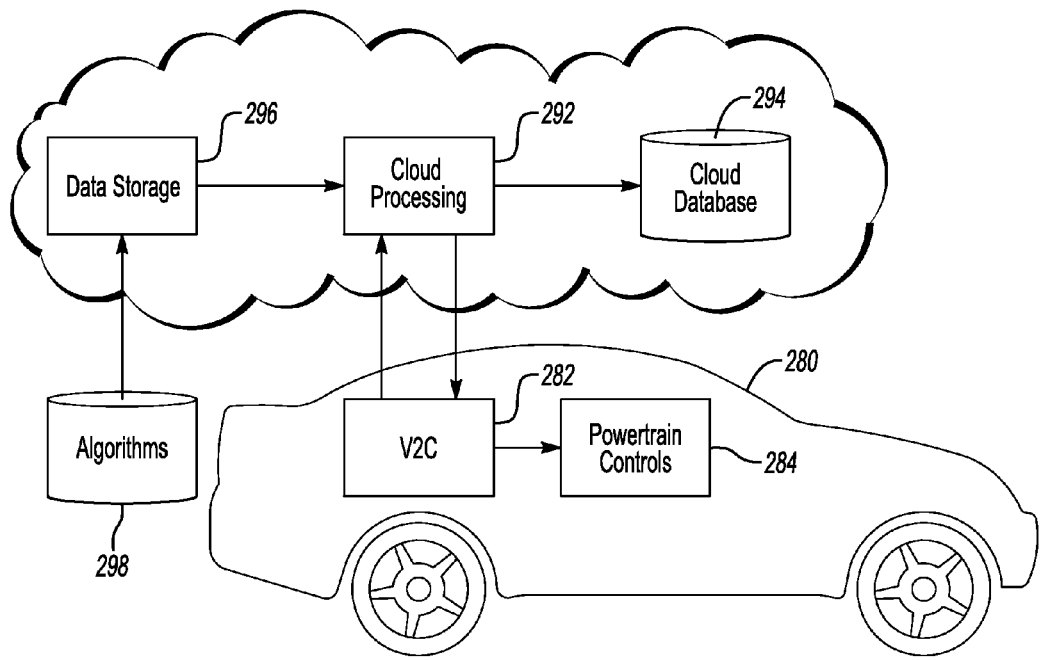
FIG. 2B illustrates another example of a VCS in communication with the cloud.

FIG. 2B shows another example of an illustrative V2C system. In this illustrative example, the V2C talks to an exemplary cloud computing resource capable of cloud-based processing 292. In this example, the cloud computing resource can perform any requested computation.

For example, without limitation, the cloud computing resource may use one or more OEM provided optimization algorithms 296. These algorithms may be stored and/or updated from a site-based database 298 that the OEM updates as needed. The computing resource 292 can also draw on data from across the cloud 294 as needed to complete the computation.

Figure 3:
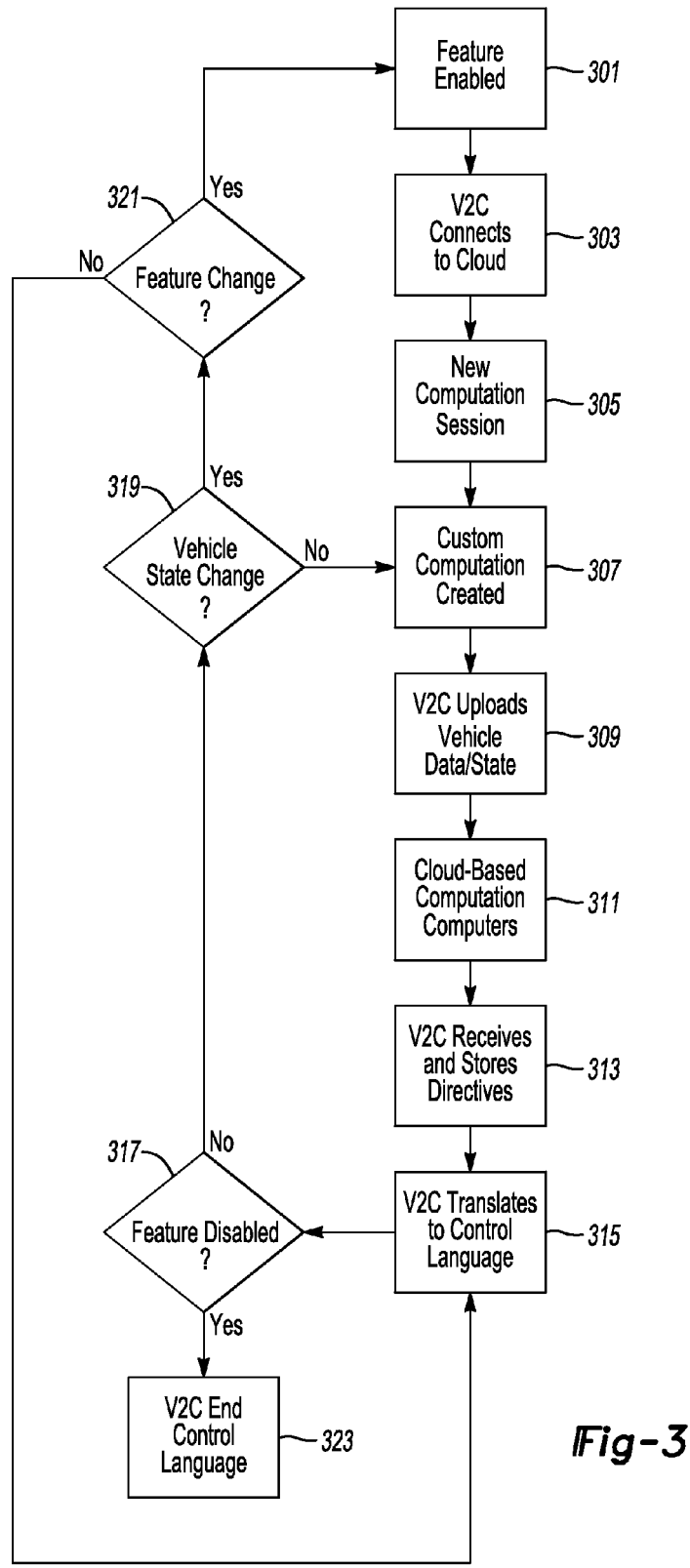
FIG. 3 is a flow chart of an exemplary process for V2C cloud communication.

FIG. 3 shows an illustrative process for V2C cloud communication with respect to powertrain control. Although the illustrative examples deal with powertrain control, cloud computing can be used in the optimization of other vehicle systems in a similar manner.

In this illustrative example, a driver first enables a feature 301 that requires or uses cloud-based optimization. In this particular example, the feature relates to powertrain optimization. Since the optimization of a powertrain may require both numerous and intensive computations, in this example the computations are done off-board in the cloud and relayed to the V2C system. This also allows the computation system to access cloud-based data resources easily, such as, but not limited to, topography maps, weather data systems, etc.

Once the feature has been enabled, the V2C may initiate a connection to the internet 303 to connect to a process for performing a desired computation. In this example, the V2C uploads contextually relevant information 305. For example, with respect to a powertrain computation, it may be useful to know a vehicle location and a vehicle planned route. Other data may also be useful, and data may vary based on the computation being provided.

Next, in this embodiment, a requested cloud-based computation is created (or referenced, if already created and stored) 307. In this illustrative example, the computation relates to the strategy requested by the V2C. The computation may also need vehicle state/status inputs from the V2C, which can be uploaded from the vehicle 309. Next, in this process, the cloud based algorithm produces a high-level control directive 311. This is a general strategy for the powertrain, but, in this example, could not be fed directly to the powertrain.

This directive will be sent to the V2C 313, and will provide a strategy for powertrain control. Since the V2C has access to the present state of the powertrain at any time (as opposed to having to relay it to the cloud), the V2C may be in a better position to determine exactly when and if to implement the strategy. Also, deviances from a route, for example, can change the state and desirability of the strategy, and the V2C is equipped to respond better to such changes due to relay time. The strategy can be put in control language in the cloud, but, at least with present transfer speeds, dropped packets and latencies, the user experience may be better served by having the V2C do the translation.

Once the V2C has the high-level directives, it can create control signals for use by the powertrain and send them on to the powertrain 315. These signals can be quickly received and implemented by the powertrain, and also can be adapted to changing road conditions/vehicle states. In this embodiment, the process then checks to ensure the feature is still enabled 317. For example, without limitation, if the torque converter bypass clutch is locked, it may be preferable to allow the bypass clutch to slip based on the road conditions. If the feature is disabled, then, in this embodiment, the process exits 323 and terminates implementation of the commands.

If the feature is still enabled, it's also possible that the vehicle state has changed significantly 319. For example, without limitation, the vehicle may have left the known route, or have entered a new route. Alternatively or additionally, a new feature may have been engaged, or the context of a feature may have changed (e.g., without limitation, bypass clutch has unlocked and begun slipping). If such a context change has happened 321, a new session and control strategy may be needed.

If there is no state change, then the V2C may upload new data to the cloud in an effort to maintain a constant updating of the control directives. This fast, dynamic updating allows for more efficient usage of fuel, among other things. For example, it would also be possible to get a single control strategy and stay with that strategy for a longer period of time, but if cloud access is available then the more dynamically the data can be refreshed the easier it will be to ensure that the strategy is as close to optimal as possible.

Figures 4, 5:
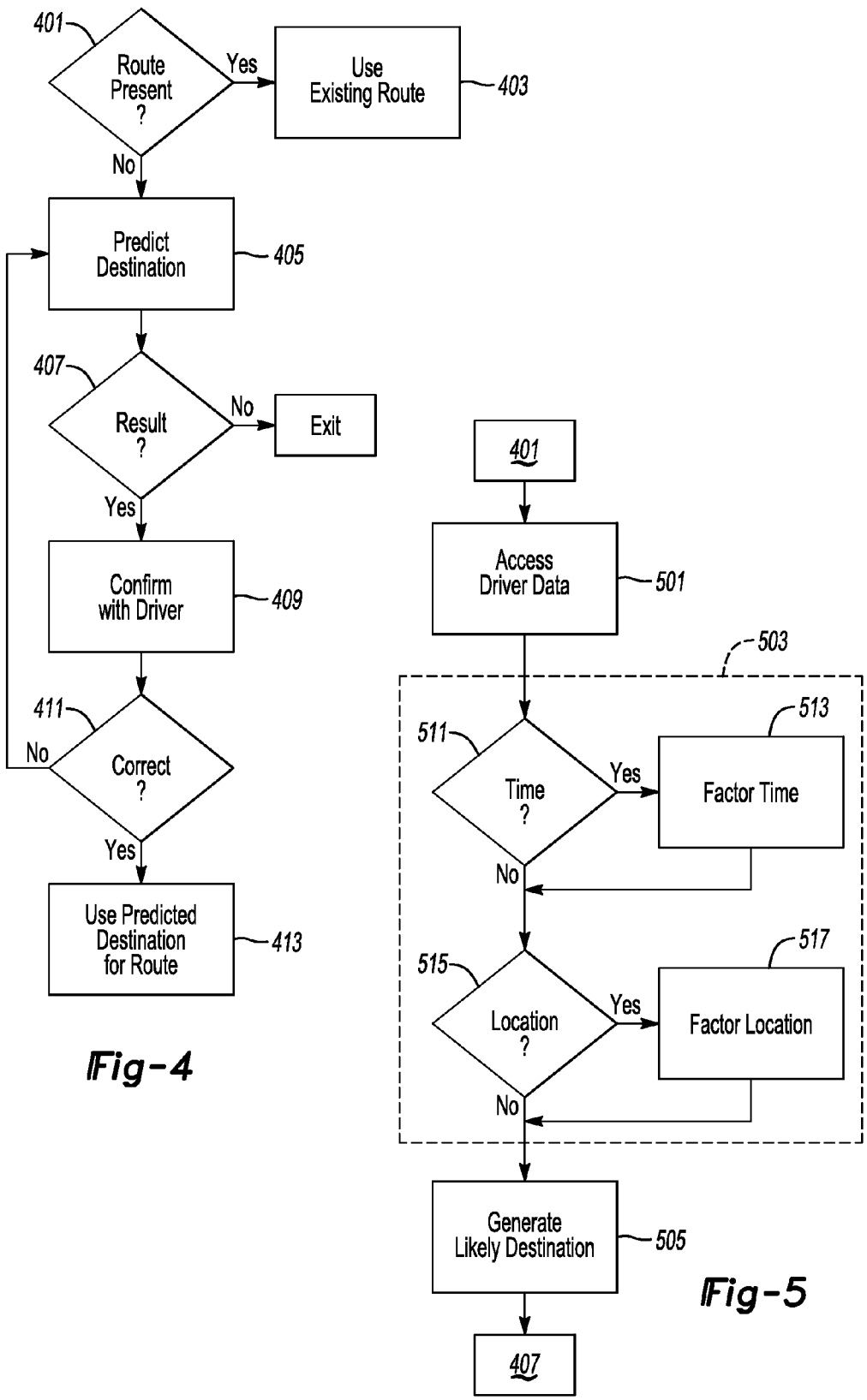
FIG. 4 is a flow chart of an exemplary process for obtaining route information when an operator of the vehicle has not input a particular route.
FIG. 5 is a flow chart of an exemplary process for predicting a route.

FIG. 4 shows an illustrative example of a process for obtaining route information when the user has not input a particular route. In this illustrative example, a predictive process is used. The predictive process considers one or more factors relating to a current state of the user (e.g., without limitation, time of day, present location, etc.). Based at least in part on information congruencies relating to the considered factors, the system may attempt to predict or guess where the user intends to travel.

First, the process checks to see if a route has been user-input 401. If the user has input a route, no prediction is necessary, so the process can simply use the input route 403.

If there is no input route, however, the process may attempt to predict a route 405. Since the process may not actually know definitively where the user is intending to travel, provided that the prediction attempt gives a result 407, the process may confirm a predicted destination 409. If the user concurs 411, the process can use a route to the predicted destination as a route to be traveled 413. If the user does not concur, the process can try predicting again, eliminating the first prediction from the set of possible destinations.

In at least one illustrative example, data recorders may log usage of a vehicle. While logging usage, they may also record times, weather data, other environmental data, dates of travel, etc. When sufficient data on a particular vehicle is gathered, predictive routing may be implemented. FIG. 5 shows one illustrative example of a prediction process.

In the example shown in FIG. 5, one or more pieces of driver data stored in a database are accessed 501. As noted, this data may have been gathered over the time, and stored with respect to a vehicle or even a particular driver.

Element 503 of FIG. 5 shows some illustrative non-limiting examples of factors that may be considered in determining a likely route. In this example, the process checks to see if a current time is known 511, and if so, the process will factor time into the prediction 513, by, for example, determining where the driver or vehicle usually travels at the known time. Also, in this example, the process checks to see if a vehicle location is known 515. If the location is known, the process may consider location in a prediction 517. For example, if it is 6 AM and the location is the user's house, and it is a weekday, there is a reasonable chance the vehicle may be going to work, school, etc. Other factors not shown may also be considered.

In one example of other factors, it is common that people do not always go to the same locations on, for example, weekends. But, if someone commonly heads to the movies on Sunday whenever it is raining, then entering the vehicle on a Sunday afternoon while it is raining may cause a prediction that the vehicle is headed to the movies. By considering a variety of geographic, temporal and/or environmental factors, suitable predictions of destinations can be made 505. Also, this allows a user to utilize systems such as the present invention's capabilities without requiring the user to input a destination every time a vehicle is used.

Routing generating methods as described in FIGS. 4 and 5 thus allow the vehicle to recall information about road conditions of upcoming roads. For example, the vehicle can determine, based on the upcoming route, whether the upcoming roads are gravel, windy, bumpy, flat, etc. Based on this knowledge, and other factors that will be discussed, the vehicle can prepare for the upcoming road conditions by commanding actions in the powertrain or driveline of the vehicle before the vehicle reaches the certain road condition. Additional details of embodiments of such a system will be discussed with reference to FIGS. 6-7.

Figure 6:
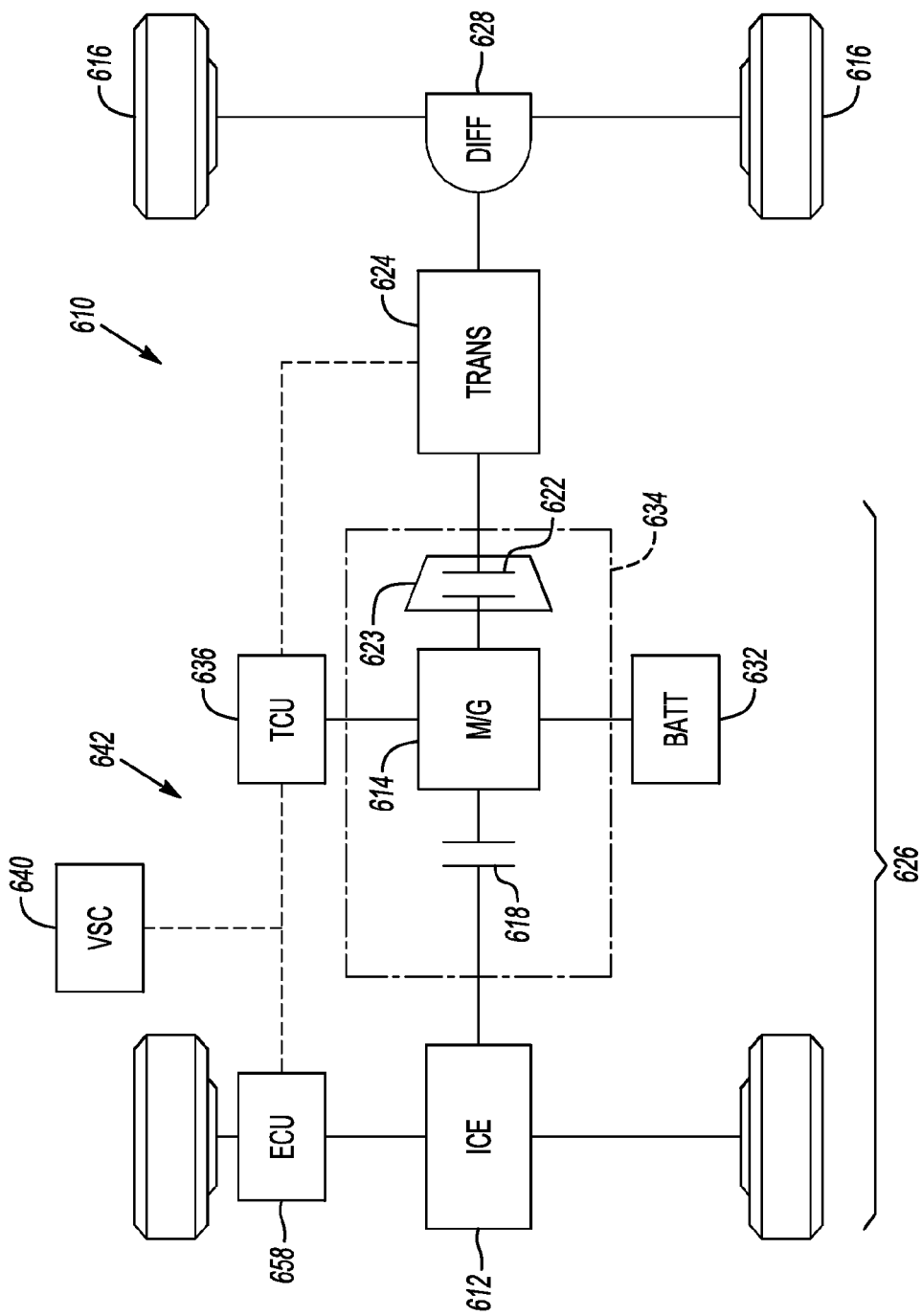
FIG. 6 illustrates a schematic diagram of a vehicle according to one embodiment.

Referring to FIG. 6, a schematic diagram of one example of a hybrid vehicle 610 in which the VCS 1 can be utilized with is illustrated. The vehicle 610 includes an engine 612, and an electric machine, which, in the embodiment shown in FIG. 6, is a motor generator (M/G) 614, and alternatively may be a traction motor. The M/G 614 is configured to transfer torque to the engine 612 or to the vehicle wheels 616.

The M/G 614 is connected to the engine 612 using a first clutch 618, also known as a disconnect clutch or the upstream clutch. A second clutch 622, also known as a launch clutch or the downstream clutch, connects the M/G 614 to a transmission 624, and all of the input torque to the transmission 624 flows through the launch clutch 622. Although the clutches 618, 622 are described and illustrated as hydraulic clutches, other types of clutches, such as electromechanical clutches may also be used. Alternatively, the clutch 622 may be a torque converter bypass clutch associated with a torque converter 623, as described further below. The downstream clutch 622 therefore refers to various coupling devices for the vehicle 610 including a traditional clutch, and torque converter bypass clutch. This configuration may use an otherwise conventional automatic step-ratio transmission with a torque converter and is sometimes referred to as a modular hybrid transmission configuration.

The engine 612 output shaft is connected to the disconnect clutch 618, which in turn is connected to the input shaft for the M/G 614. The M/G 614 output shaft is connected to the launch clutch 622, which in turn is connected to the transmission 624. The various components of the vehicle 10 are positioned sequentially in series with one another. The launch clutch 622 connects the vehicle prime movers to the driveline 626, which includes the transmission 624, a differential 628, and vehicle wheels 616, and their interconnecting components. In other embodiments, the method described herein may be applied to hybrid vehicle having other system architectures.

In some embodiments, the transmission 624 is an automatic transmission and connected to the drive wheels 616 in a conventional manner, and may include a differential 628. The vehicle 610 is also provided with a pair of non-driven wheels, however, in alternative embodiments, a transfer case and a second differential can be utilized to positively drive all of the vehicle wheels.

As previously described, in various embodiments of the vehicle 610 the downstream clutch 622 is a bypass clutch associated with a torque converter 623. The input from the M/G 614 is the impeller side of the torque converter 623, and the output from the torque converter 623 to the transmission 624 is the turbine side of the torque converter 623. The torque converter 623 transfers torque using its fluid coupling, and torque multiplication may occur depending on the amount of slip between the impeller and turbine sides.

The torque converter 623 has torque multiplication effects when certain rotational speed differentials exist across the torque converter 623. During torque multiplication, the output torque of the torque converter is larger than that of the input torque due to torque multiplication across the torque converter 623. Torque multiplication exists, for example, when the vehicle 610 is started from rest and the input shaft to the torque converter 623 begins to rotate, and the output shaft from the torque converter 623 is still at rest or has just begun to rotate.

The lock-up clutch, or bypass clutch 622 for the torque converter 623 may be selectively engaged to create a mechanical or frictional connection between the impeller side and the turbine side for direct torque transfer. The bypass clutch 622 may be slipped and/or opened to control the amount of torque transferred through the torque converter 623. The torque converter 623 may additionally also include a mechanical lockup clutch or one way clutch.

The bypass clutch 622 is used to lock out the torque converter such that the input and output torques for the downstream torque converter 623 are equal to one another, and the input and output rotational speeds across the torque converter 623 are equal to one another. A locked clutch eliminates slipping and driveline inefficiency across the torque converter 623, for example, when the rotational speed ratio across the torque converter is greater than approximately 0.8, and may increase fuel efficiency for the vehicle 10.

The M/G 614 is in communication with a battery 632. The battery 632 may be a high voltage battery. The M/G 614 may be configured to charge the battery 632 in a regeneration mode, for example when vehicle power output exceeds driver demand, through regenerative braking, or the like. The M/G 614 may also be placed in a generator configuration to moderate the amount of engine 612 torque provided to the driveline 626. In one example the battery 632 is configured to connect to an external electric grid, such as for a plug-in hybrid electric vehicle (PHEV) with the capability to recharge the battery from an electric power grid, which supplies energy to an electrical outlet at a charging station.

The M/G 614 and the clutches 618, 622 may be located within a motor generator case 634, which may be incorporated into a case for the transmission 624, or alternatively, in a separate case within the vehicle 610. The transmission 624 has a gear box to provide various gearing ratios for the vehicle 610. The transmission 624 gearbox may include clutches and planetary gearsets, or other arrangements of clutches and gear trains as are known in the art. In alternative embodiments, the transmission 624 is a continuously variable transmission or automated mechanical transmission. The transmission 624 may be an automatic six speed transmission, other speed automatic transmission, or other gearbox as is known in the art.

Various controllers can be provided throughout the vehicle 610. For example, a transmission control unit (TCU) 636 controls and operates the transmission 624 on a shift schedule, such as a production shift schedule, that connects and disconnects elements within the gear box to control the gear ratio between the transmission output and transmission input. The TCU 636 may also control the M/G 614, the clutches 618, 622, and any other components within the motor generator case 634. An engine control unit (ECU) 638 is configured to control the operation of the engine 612. A vehicle system controller (VSC) 640 transfers data between the TCU 636 and ECU 638 and is also in communication with various vehicle sensors. These control units and other controllers can collectively be referred to as one or more controller within a control system 642. Some or all of the controllers may be connected by a controller area network (CAN) or other system. The control system 642 may be configured to control operation of the various components of the transmission 624, the motor generator assembly 634, the clutches 618, 622, and the engine 612 under any of a number of different conditions.

For purposes of the present disclosure, it should be understood that the vehicle 610 illustrated in FIG. 6 is not limiting. For example, embodiments of the present disclosure can be applied to other hybrid arrangements as well as non-hybrid vehicles in which a torque converter bypass clutch is utilized.

As previously described, it may be beneficial to have the bypass clutch 622 locked as often as possible for various reasons, including fuel efficiency for example. The TCU 636 may, however, command the bypass clutch 622 to slip to meet torque demands of the driver of the vehicle. For example, in the hybrid vehicle illustrated in FIG. 6, if the engine 612 is disabled, the torque of the M/G 614 alone must meet the demand. In these and other situations, the TCU 636 may command the bypass clutch to slip to increase the torque delivered to the transmission 624 to fulfill demands.

According to embodiments of the present disclosure, the TCU 636 may command the bypass clutch 622 to slip for various other reasons. For example, slipping the bypass clutch 622 during changes in road types (e.g., paved to gravel) eases the transition between the road types by softening driveline disturbances. By utilizing data obtained from the cloud, the TCU 636 can command the bypass clutch 622 to slip (or enable the bypass clutch 622 to slip when it otherwise would not) in anticipation of future road conditions.

Figure 7:
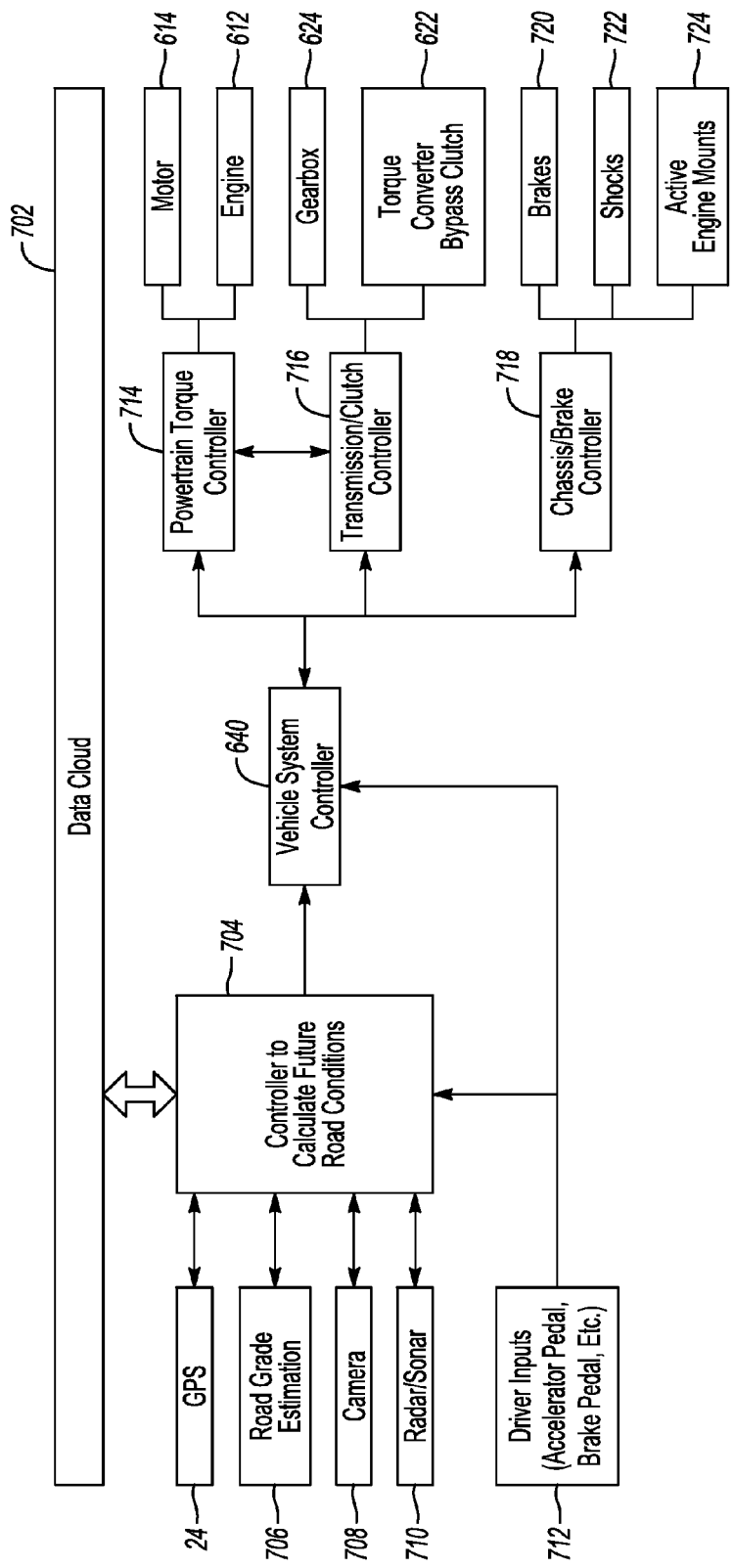
FIG. 7 illustrates a diagram of a communication strategy between various vehicle components with controllers that communicate with the cloud.

FIG. 7 shows a system in which the vehicle communicates with the data cloud 702 to anticipate future road conditions and provide a preemptive driveline control based on upcoming drive conditions. As previously described, a controller 704 such as the V2C 282 or VSC 640 communicates (two-way) with the data cloud 702. The controller 704 communicates with the GPS unit 24 according to methods previously described to determine vehicle location. The controller 704 may also be in communication with a road grade estimation system 706, a camera 708 mounted on the vehicle, and a radar/sonar device 710 on the vehicle. Driver inputs, such as accelerator pedal demand, brake pedal demand, etc. can also be sent to the controller 704 from the VSC 640, for example. During travel, the controller 704 can send information obtained from one or more of these devices 24, 706, 708, 710, 712 to indicate grading, turns, changes in road conditions or types, etc.

During a future drive along routes previously driven, data can be pulled from the data cloud 702 to estimate future road conditions according to the data previously sent to the data cloud 702. Based upon this received data, the controller 704 can estimate future road conditions. For example, the controller 704 can anticipate a change from a paved road to a gravel road at a certain location based upon data previously sent to the cloud 702 during a previous drive.

Based upon the anticipated road conditions, the VSC 640 can alter components in the vehicle. As previously described, a M/G 614, an engine 612, gearbox 624, bypass clutch 622, and other powertrain components may be provided within the vehicle and controlled by a powertrain torque controller 714 and/or a transmission/clutch controller 716. Similarly, a chassis/brake controller may control vehicle brakes 720, shock absorbers or a suspension system 722, active engine mounts 724, etc. The VSC 640 can alter the state of these and other various components in the vehicle based upon the anticipated road conditions.

For example, the torque converter bypass clutch 622 may be slipped or enabled to be slipped during the transition from one road condition to another. This allows the vehicle to anticipate the road terrain ahead, and soften or dampen disturbances that would otherwise be felt in the vehicle. By removing the direct connection between the output of the M/G 614 and the input of the transmission 624, disturbances in the road acting on the wheels 616 will not be fully correlated into a disturbance in the M/G 614, but rather will be dampened and absorbed by the torque converter 623 when the bypass clutch 622 is slipping. When the bypass clutch 622 is slipping, the VSC 640 or other controller can adjust the torque to the input of the transmission 624 in order to compensate for the torque not being fully transferred across the slipping clutch, in order to meet driver demand. For example, for the hybrid vehicle illustrated in FIG. 6, the controller can adjust the torque output from the engine and/or M/G such that the transmission input torque is generally equivalent to the combined torque from the engine and the M/G, in order to meet driver demand while the bypass clutch 622 is slipping.

In other examples, the vehicle brakes 720, shock absorbers 722, or engine mounts 724 may be adjusted in anticipation of upcoming road conditions. For example, conditions for activating any of these devices can be relaxed when the vehicle approaches a location on a road such that the devices act quicker or are more responsive when the change in the road condition actually arrives at the location. Similarly, the accelerator pedal and/or brake pedal demands may be filtered at a reduced or increased rate in response to the upcoming road conditions in order to alter the response time in which the vehicle accelerates or decelerates when the vehicle arrives at the road condition.

Figure 8:
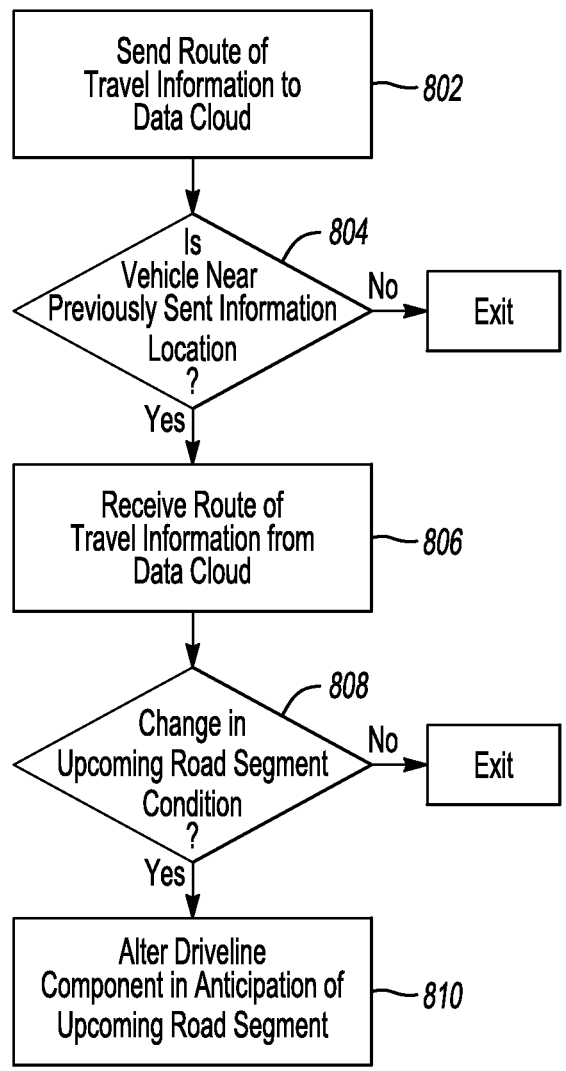
FIG. 8 is a flow chart of an exemplary method implemented by at least one controller according to one embodiment.

FIG. 8 illustrates a flow chart exemplifying one method utilized by at least one controller to communicate with the cloud and optimize driveline components based on cloud data.

At 802, the vehicle sends data to the cloud while driving. The data sent to the cloud can include route of travel information such as location, road condition data (e.g., bumpy, smooth, gravel, etc.), date, time, and other such information as previously described by methods previously described.

During a subsequent travel time, the controller determines at 804 whether the vehicle is near a location where data was previously sent to the cloud. In one embodiment, the vehicle is in continuous communication with the cloud or other remote facility, in which the remote facility and/or the controller continuously checks location data to determine if the vehicle is traveling a previously-driven path.

When the vehicle is traveling on a route previously traveled, the controller receives the route of travel information from the cloud at 806. The controller and/or the cloud can then determine if any upcoming road segment along the traveled route will change at 808. For example, the controller can determine if a bumpy road is ahead based on data about the shocks of the vehicle previously sent to the cloud.

If there is a change in condition of an upcoming road segment, the controller can then alter a driveline component in anticipate of the upcoming road segment. For example, the controller can enable the torque converter bypass clutch to slip when the vehicle travels over the upcoming road segment when the controller would normally otherwise not allow such slip. This enables an instant softening of driveline disturbances when the vehicle hits the bumps in the road segment. In another example, the controller commands the bypass clutch to slip during travel over the road segment such that disturbances in the driveline are softened. Other alterations of driveline components are contemplated as described above, such as altering the shocks, brakes, or active engine mounts.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of operating a vehicle having a torque converter bypass clutch, comprising:
   storing route of travel information including road condition data corresponding to a traveled-over road segment;
   during a subsequent travel toward the road segment, modifying clutch pressure of the torque converter bypass clutch based at least upon the road condition data.

2. The method of claim 1, wherein the storing is accomplished utilizing an on-board storage device.

3. The method of claim 1, wherein the route of travel information further includes a location of the vehicle, and wherein the modifying includes modifying clutch pressure of the torque converter bypass clutch based at least upon the location of the vehicle.

4. The method of claim 3, wherein the modifying occurs based upon the location of the vehicle being on the road segment.

5. The method of claim 1, wherein the road condition data includes data received from a suspension system indicating terrain of the road segment.

6. The method of claim 1, wherein the road condition data includes data received from a brake system indicating brake usage during travel over the road segment.

7. The method of claim 1, wherein the road condition data includes data indicating accelerator pedal usage during travel over the road segment.

8. A method for controlling a vehicle, comprising:
   altering operation of a torque converter bypass clutch based at least upon received road condition data indicating an upcoming change in road condition of a road segment.

9. The method of claim 8, further comprising storing the road condition data on an on-board storage device during a first travel over the road segment, wherein the altering includes altering clutch pressure of the torque converter bypass clutch during a second travel over the road segment based at least upon the stored road condition data.

10. The method of claim 8, wherein the road condition data includes data received from a suspension system during a previous travel over the road segment.

11. The method of claim 8, wherein the road condition data includes data received from a brake system indicating brake usage during a previous travel over the road segment.

12. The method of claim 8, wherein the road condition data includes data indicating accelerator pedal usage during a previous travel over the road segment.

13. The method of claim 8, further comprising receiving locational information of the vehicle, wherein the torque converter bypass clutch is altered further based at least upon the locational information of the vehicle.

14. The method of claim 13, wherein the torque converter bypass clutch is altered further based at least upon the location of the vehicle compared to a location of the road segment.

15. A vehicle comprising:
 a power source;
 a transmission;
 a clutch selectively coupling the power source to the transmission; and
 at least one controller programmed to (i) send route of travel information including road condition data of a traveled-over road segment to a storage device, (ii) subsequently receive the road condition data from the storage device when traveling toward the road segment, and (iii) modify pressure in the clutch based upon the received road condition data.

16. The vehicle of claim 15, wherein the storage device is mounted to the vehicle.

17. The vehicle of claim 15, further comprising a torque converter selectively coupled to the power source, wherein the clutch is a torque converter bypass clutch.

18. The vehicle of claim 15, wherein the power source includes an electric motor selectively coupled to an engine via a second clutch.

19. The vehicle of claim 15, wherein the road condition data includes data received from a suspension system.

20. The system of claim 15, wherein the road condition data includes data received from a brake system indicating brake usage during travel over the road segment.

* * * * *